United States Patent [19]

Lichti et al.

[11] Patent Number: 4,539,175
[45] Date of Patent: Sep. 3, 1985

[54] METHOD OF OBJECT CONSOLIDATION EMPLOYING GRAPHITE PARTICULATE

[75] Inventors: Wayne P. Lichti, Lakewood; Alfred F. Hofstatter, Dana Point, both of Calif.

[73] Assignee: Metal Alloys Inc., Irvine, Calif.

[21] Appl. No.: 535,791

[22] Filed: Sep. 26, 1983

[51] Int. Cl.³ ............................................ C22C 1/04
[52] U.S. Cl. .......................................... 419/49; 419/6; 419/8; 419/48
[58] Field of Search ........................ 419/6, 8, 48, 49

[56] References Cited

U.S. PATENT DOCUMENTS

| 3,356,496 | 12/1967 | Hailey | 419/6 |
| 3,689,259 | 9/1972 | Hailey | 419/48 |
| 4,142,888 | 3/1979 | Rozmus | 419/49 |
| 4,389,362 | 6/1983 | Larsson | 419/49 X |
| 4,414,028 | 11/1983 | Inoue | 419/49 X |
| 4,431,605 | 2/1984 | Lueth | 419/49 X |
| 4,446,100 | 5/1984 | Adlerborn et al. | 419/49 X |

FOREIGN PATENT DOCUMENTS 215535 9/1969 Japan .................................. 419/48

Primary Examiner—Leland A. Sebastian
Attorney, Agent, or Firm—William W. Haefliger

[57] ABSTRACT

The method of consolidating a metallic, metallic and ceramic, or ceramic body in any of initially powdered, sintered, fibrous, sponge, or other form capable of compaction, includes the steps:
(a) providing a bed of flowable particles within a contained zone, the particulate primarily including flowable and resiliently compressible carbonaceous particles,
(b) positioning that body in the bed,
(c) and effecting pressurization of the bed to cause pressure transmission via the particles to the body, thereby to compact the body into desired shape, increasing its density.

17 Claims, 9 Drawing Figures

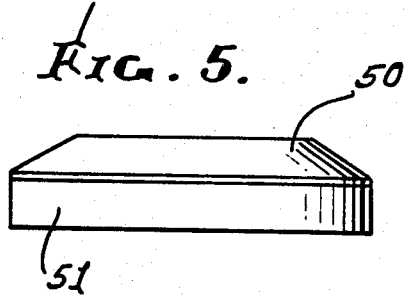
FIG. 5.
FIG. 6.
FIG. 7. "PRIOR ART"
100 X
S.E.M.
FIG. 8. "PRIOR ART"

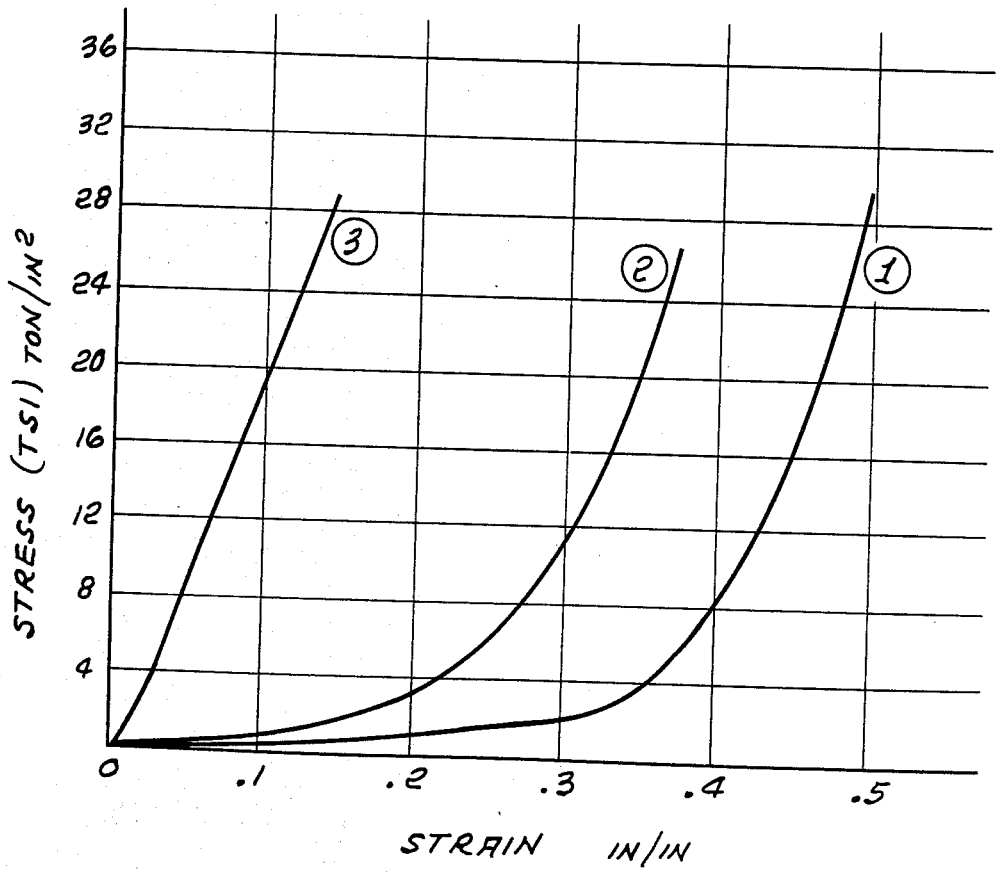

METHOD OF OBJECT CONSOLIDATION EMPLOYING GRAPHITE PARTICULATE

FIELD OF THE INVENTION

This invention relates to the field of consolidating bodies, and more specifically, to an improved method which enables complex metallic or ceramic bodies to be made with minimal distortion, to near net shape.

PRIOR ART

Methodology associated with producing high density metallic objects by consolidation is recognized in the prior art. Exemplars of prior art references which discuss such methodology are U.S. Pat. Nos. 3,356,496 and 3,689,259. Prior to discussing these references, a brief discussion will be set forth which illustrates the two primary methodologies currently used to densify either either loose powder or a prepressed metal powder compact. These two techniques are generally referred to as Hot Isostatic Pressing and Powder Forging. The Hot Isostatic Pressing ("HIP") process comprises placing loose metal powder or a prepressed compact into a metal can or mold, and subsequently evacuating the atmosphere from the can, sealing the can to prevent any gases from re-entering, and placing the can in a suitable pressure vessel. The vessel has internal heating elements to raise the temperature of the powder material to a suitable consolidation temperature. Internal temperatures of 1000° C. to 2100° C. are typically used depending upon the material being processed. Coincident with the increase in the internal temperature of the HIP vessel, the internal pressure is slowly increased and maintained at from 15,000 to about 30,000 psi, again depending upon the material being processed. Under the combined effects of temperature and isostatic pressure, the powder is densified to the theoretical bulk density of the material.

A HIP vessel can accept more than one can during a given cycle and thus there is the ability to densify multiple powdered metal articles per cycle. In addition, by the use of isostatic pressure, the densification is more or less uniform throughout the formed article. By the use of suitable can design, it is possible to form undercuts for transverse holes or slots in the densified article. However, the cycle time of the charge is slow, often requiring 8 hours or longer for a single cycle. Further, at the completion of the cycle, the cans surrounding the powdered metal articles have to be either machined off or chemically removed.

The second common method of densifying powdered metal is a technique referred to as Powder Forging ("PF"). The Powder Forging process comprises the steps of:

(a) cold compacting loose metal powder at room temperature in a closed die at pressures in the range of 10–50 TSI into a suitable geometry (often referred to as a "preform") for subsequent forging. At this stage, the preform is friable and may contain 20–30 percent porosity and its strength is derived from the mechanical interlocking of the powdered particles.

(b) sintering the preform (i.e. subjecting the preform to an elevated temperature at atmospheric pressure) under a protective atmosphere. Sintering causes solid state "welding" of the mechanically interlocked powdered particles.

(c) reheating the preform to a suitable forging temperature (depending upon the alloy). Alternately this reheating step may be incorporated into the sintering step.

(d) forging the preform in a closed die into the final shape. The die is tyically maintained at a temperature of about 300° F. to 600° F.

The forging step eliminates the porosity inherent from the preforming and gives the final shape to the PF part.

Advantages of Powder Forging include: speed of operation (up to 1000 pieces per hour); ability to produce a net shape; mechanical properties substantially equivalent to those of conventionally forged products; and increased material utilization. However, there are number of disadvantages including nonuniformity of density because of chilling of the preform when in contact with the relatively cold die, draft required on sides and walls, and the inability to form undercuts which can be done in HIP.

The patents mentioned above disclose what appears to be a combination of isothermal and isostatic conditions of HIP and HIP's ability to form undercuts, with the high speed, low cost continuous production normally associated with Powder Forging. In the '496 patent, the use of a cast ceramic outer container is taught as the primary heat barrier. In addition, this cast ceramic outer container when deformed causes nearly uniform distribution of pressure on the powdered material.

In the '259 patent the use of granular refractory materials is taught. This reference is intended as an improvement over the earlier '496 patent in relation to faster heating of the grain, and faster heating of the prepressed part.

While the '496 and '259 patents may represent advances in the art, significant problems remain with respect to the use of a bed of ceramic into which a preform is typically placed prior to consolidation. More specifically, it has been found that the use of crushed and ground ceramics or carbides results in a significantly non-uniform pressure distribution from the top of the charge (the surface against the moving press member) to the bottom of the charge (the surface against the fixed press bed). This non-uniformity of pressure distribution is readily demonstrated when consolidating a prepressed right circular cylinder of a powdered material. After consolidation in a bed of crushed and ground or fused ceramic material to nearly 100% of bulk density, it was determined that the surface of the prepressed cylinder nearest the moving press ram was smaller in diameter than the surface nearest the fixed bed. Sectioning the consolidated cylinder along a diameter and examining the sectioned surface, indicated that it had the shape of a trapezoid. The above phenomena was observed in all consolidated articles when a crushed and ground or fused granular ceramic matrix was employed as the consolidation media.

The solution to the problems associated with such distortion and lack of dimentional stability in shape has proved illusive, especially when the solution must also be applicable to mass production. The present invention provides a solution which is adaptable to mass production.

SUMMARY OF THE INVENTION

It is a major object of the invention to provide a method or methods of consolidating method, metal and ceramic, or ceramic bodies which obviate the above described as well as additional problems and difficulties. Basically, the method of the invention is applicable to such bodies in any of initially powdered, sintered, fibrous, sponge or other form capable of compaction, and includes the steps:

(a) providing a bed of flowable particles within a contained zone, said particles primarily including flowable and resiliently compressible carbonaceous particles, (b) positioning the body in the bed, (c) and effecting pressurization of said bed to cause pressure transmission via said particle to said body, thereby to compact the body into desired shape, increasing its density.

As will appear, the carbon particles may with unusual advantage consist essentionally of compressible beads, typically having nodules projecting outwardly at the bead surfaces, and the beads being especially effective when they consist of graphite and are generally spheroidal. In this regard, compaction is most advantageously carried out at elevated temperature of the body, i.e. at temperatures within the range 1700° F. to 4,000° F. Further, the pressurization may be effected to resiliently compress the particulate closest to the body so that when the compacted body is removed from the bed the particulate closest to the body surface flows freely on that surface to minimize clean-up of the compacted body surface. Also, it is found that the use of carbonaceous particles or granules results in minimum agglomeration of the particles, so that they remain free flowing and can be quickly re-cycled for re-use in a subsequent compaction operation.

A further aspect of the invention concerns the consolidation as referred to, of the body in the form of a metal layer on a carrier (cladding); and as will appear, that metal layer may consist of tungsten on a carrier consisting of molybdenum.

By the use of the methodology of the present invention, substantially improved structural articles of manufacture can be made having minimal distortion, as particularly enabled by the use of carbonaceous particulate in flowable form.

The novel features which are believed to be characteristic of this invention, both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawings are for the purposes of illustration and description only and are not intended as a definition of the limits of the invention.

DRAWING DESCRIPTION

FIG. 5 is a side elevation showing a body to be compacted, on a carrier;

FIG. 6 is a fragmentary vertical section taken through the FIG. 5 body;

FIG. 7 is a photographic enlargement of graphite bed particles; and

FIG. 8 is a drawing of certain such particles; and

FIG. 9 is a graph.

DETAILED DESCRIPTION

Figure 1:
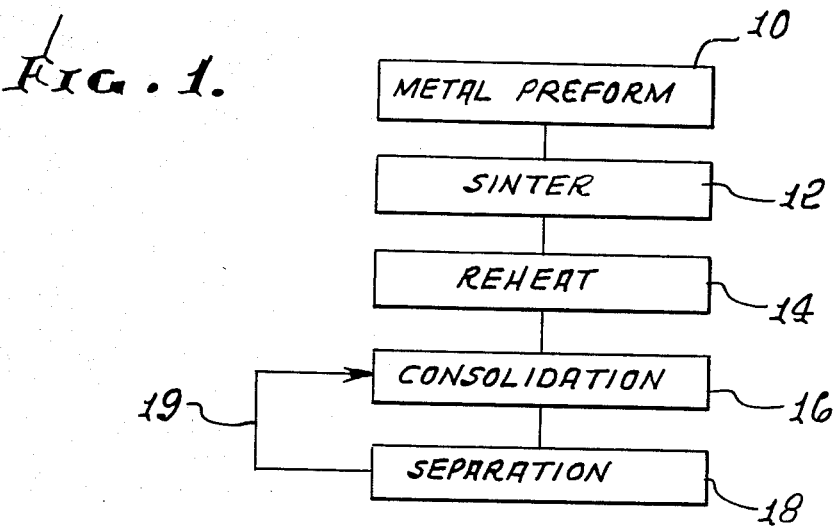
FIG. 1 is a flow diagram showing the method steps of the present invention.

Referring first to FIG. 1, there is shown a flow diagram illustrating the method steps of the present invention. As can be seen from numeral 10, initially a metal, metal ceramic, or ceramic article of manufacture or preform is made, for example, in the shape of a wrench or other body. While the preferred embodiment contemplates the use of a metal preform made of powdered steel particles, other metals and ceramic materials such as alumina, silica and the like are also within the scope of the invention. A preform typically is about 85 percent of theoretically density. After the powder has been made into a preformed shape, it is typically subsequently sintered in order to increase the strength. In the preferred embodiment, the sintering of the metal (steel) preform requires temperatures in the range of about 2,000° to 2,300° F. for a time of about 2–30 minutes in a protective atmosphere. In the preferred embodiment such protective, non-oxidizing inert atmosphere is nitrogen-based. Subsequent to sintering, illustrated at 12, the preforms can be stored for later processing. Should such be the case, as illustrated at 14, the preform is subsequently reheated to approximately 1950° F. in a protective atmosphere.

The consolidation process, illustrated at 16, takes place after the hot preform has been placed in a bed of heated carbonaceous particles as hereinbelow discussed in greater detail. In order to generate the desired high quantity of production, alternating layers or beds of carbonaceous particles and hot preforms can be used. Further, in order to speed up production, consolidation can take place subsequent to sintering, so long as the preform is not permitted to cool. Consolidation takes place by subjecting the embedded preform to high temperature and pressure. For metal (steel) objects, temperatures in the range of about 2,000° F. and uniaxial pressures of about 40 TSI are used. Compaction at pressures of 10–60 tons depending on the material are also within the scope of the present invention. The preform has now been densified and can be separated, as noted at 18, where the carbonaceous particles separate readily from the preform and can be recycled as indicated at 19. If necessary, any particles adhering to the preform can be removed and the final product can be further finished.

As discussed above, one problem associated with the use of a ceramic bed was that the final product suffered from distortion. Microscopic examination of such crushed and ground or fused granular ceramic materials indicate a highly irregular shape, with many individual particles having a cross-sectional appearance either rectangular or triangular. It was further determined that when using a bed of spheroidal ceramic particles, product distortion remained. Even though the use of such a bed produced articles of more dimensional stability as compared with the prior art, the need to improve such dimensional stability remained.

It has been discovered in accordance with the present invention that an unusual high degree of product dimensional stability is obtained when the bed primarily (and preferably substantially completely) consists of flowable carbonaceous particles. For best results, such particles are resiliently compressible graphite beads, and they have outward projecting nodules on and spaced apart on their generally spheroidally shaped outer surfaces, as well as surface fissures. See for example FIG. 8, showing certain particles 40 or granules as they also appear in the photographic reproduction of FIG. 7. Their preferred size is between 50 and 240 mesh. Useful granules are further identified as desulphurized petroleum coke. Such carbon or graphite particles have the following additional advantages in the process:

(1) They form easily around corners and edges, to distribute applied pressure essentially uniformly to and over the body being compacted. The particles suffer very minimal fracture, under compaction pressure.

(1a) The particles are not abrasive, therefore reduced scoring and wear of the die is achieved.

(2) They are elastically deformable, i.e. resiliently compressible under pressure and at elevated temperature, the particles being stable and usable up to 4000° F.; it is found that the granules, accordingly, tend to separate easily from (i.e. do not adhere to) the body surface when the body is removed from the bed following compaction.

(3) The granules do not agglomerate, i.e. cling to one another, as a result of the body compaction process. Accordingly, the particles are readily recycled, for re-use, as at 19 in FIG. 1.

(4) The graphite particles become rapidly heated in response to AC induction heating, whereby the FIG. 1 step 14 may include or consist of such induction heating. The particles are stable and usable at elevated temperatures up to 4000° F. Even though graphite oxidizes in air at temperatures over 800° F., short exposures as during cool-down, do not harm the graphite particles.

Figure 2:
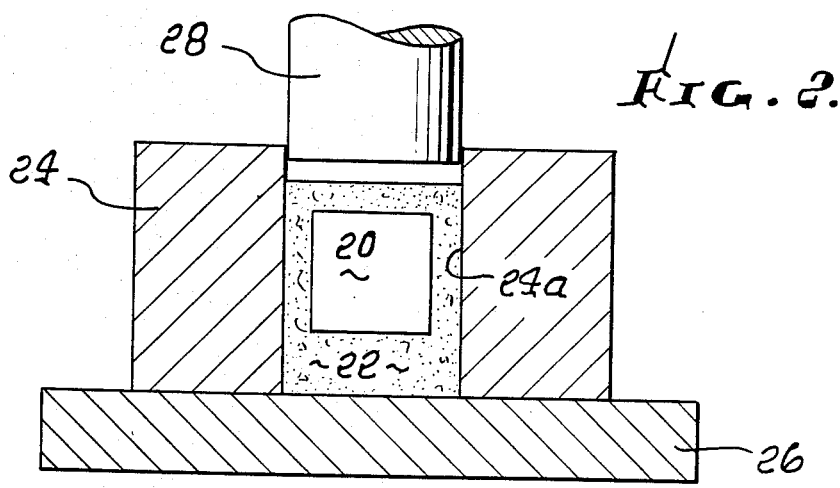
FIG. 2 is a cut-away plan view showing the consoldation step of the present invention.

(5) The use of the graphite particle bed enables significant reduction (up to 40%) in compaction force application, as via piston 28 in FIG. 2, whereby the necessary size of the compaction equipment may be reduced.

Referring now to FIG. 2 the consolidation step is more completely illustrated. In the preferred embodiment, the preform 20 has been completely embedded in a bed of carbonaceous particles 22 as described, and which in turn have had placed in a contained zone 24a as in consolidation die 24. Press bed 26 forms a bottom platen, while hydraulic press ram 28 defines a top and is used to press down onto the particles 22 which distributes the applied pressure substantially uniformly to preform 20. The preform is at a temperature between 1000° F. and 4000° F., prior to compaction (and preferably between 1700° F. and 4000° F.). The embedded metal powder preform 20 is rapidly compressed under high uniaxial pressure by the action of ram 28 in die 24.

Figure 3:
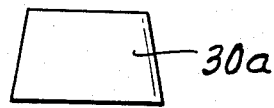
FIG. 3 is a plan view showing a consolidated article of manufacture which has been consolidated in a bed of alumina particles not of spheroidal shape.
Figure 4:
FIG. 4 is a plan view showing a consolidated article of of manufacture which has been consolidated in a bed of graphite particles.

As discussed above, use of ceramic particles produces nonuniform pressure distribution such that after consolidation a plan view of a cylinder 30a sectioned along a diameter would tend to have the shape of a trapezoid as illustrated in FIG. 3. Referring now to FIG. 4, it is seen that the same prepressed right circular cylinder 30b when consolidated in a graphite bed 22 retained its original shape, i.e. the diameter remains substantially uniform from top to bottom. Thus, by the use of a graphite bed particulate, the need for further machining and/or redesigning of the preform is substantially eliminated.

FIGS. 5 and 6 show the body in the form of a metallic layer 50 on a carrier 51. As shown, the layer has frustoconical shape and may consist of tungsten on a molybdenum carrier or base. The body is usable as an X-ray target, and it is found that densification of the tungsten, by compaction, substantially increases the useful life of the target, with corresponding savings in cost.

FIG. 9 depicts stress-strain curves for different volume percentages of mixed graphite particles and bauxite ceramic particles, in a bed. It will be noted that for a given applied stress, the strain (compressibility) of the bed increases with an increased percentage of graphite particles, and is greatest for an all graphite bed. Mixtures of graphite particles and other carbonaceous or ceramic particles allows a tailoring of the characteristics of shape control on a body being consolidated.

In FIG. 7 the graphite granules are enlarged 100 times. Note also the fissures in many particles, which contribute to compressibility.

It is also possible to employ a minor portion, by volume, of ceramic particles admixed with the carbonaceous particles in the bed 22. Such ceramic particles typically are within the size range 50–240 mesh, and may for example consist of bauxite.

Beads as shown in FIGS. 7 and 8 are obtainable from Superior Graphite Co., Chicago. Ill.

U.S. Pat. No. 4,160,813 discloses a method for producing graphite beads or granules employed in the above process.

We claim:

1. The method of consolidating a metallic, metallic and ceramic, or ceramic body in any of initially powdered, sintered, fibrous, sponge, or other form capable of compaction, that includes the steps:
   (a) providing a bed of flowable particles within a contained zone, said particulate primarily consisting of flowable and resiliently compressible carbonaceous particles in the form of beads having outwardly projecting nodules thereon, and at least some beads having surface fissures,
   (b) positioning said body in said bed, to be surrounded by said beads,
   (c) and effecting pressurization of said bed to cause pressure transmission via said particles to said body, thereby to compact the body into desired shape, increasing its density.

2. The method of claim 1 wherein said pressurization of said bed is carried out uniaxially only.

3. The method of claim 1 wherein said particles are generally spheroidal and consist of graphite.

4. The method of claim 1 wherein said (b) step is carried out at elevated temperatures.

5. The method of claim 1 wherein said body in said bed, prior to said compaction, is at a temperature between about 1000° F. and 4000° F.

6. The method of claim 1 wherein said body is positioned in said bed to be surrounded by said particulate, the bed consisting substantially entirely of particles in the form of graphite beads.

7. The method of any one of claims 1, 2, 3, 4, 6, and 7, wherein said pressurization is carried out to compress the particulate closest to the body, so that when the compacted body is removed from said bed, the particulate closest to the body flows off the body.

8. The method of claim 1 wherein said bed contains sufficient of said flowable carbonaceous particles as to remain essentially free of agglomeration during said (c) step.

9. The method of claim 2 wherein said bed consists essentially of all graphite particles.

10. The method of claim 1 wherein said body is on a carrier which is also positioned in said bed.

11. The method of claim 10 wherein said body consists of a metal layer on said carrier.

12. The method of claim 11 wherein said metal layer consists essentially of tungsten.

13. The method of claim 12 wherein said carrier consists essentially of molybdenum, and said tungsten layer has annular shape on the carrier.

14. The method of any one of claims 1-6 and 8-13 wherein the particle mesh size is between 50 and 240.

15. The method of one of claims 2 and 9 wherein a substantial number of said particles contain fissures.

16. The method of one of claims 1, 2 and 3-6 wherein said particulate also includes ceramic particles admixed with said carbonaceous particles.

17. The method of one of claims 1, 2 and 3-6 wherein said particulate also includes ceramic particles admixed with said carbonaceous particles, all of said particles having a mesh size between 50 and 240.

* * * * *

UNITED STATES PATENT AND TRADEMARK OFFICE
CERTIFICATE OF CORRECTION

PATENT NO. : 4,539,175
DATED : Sept.3, 1985
INVENTOR(S) : Wayne P. Lichti and Alfred F. Hofstatter It is certified that error appears in the above-identified patent and that said Letters Patent are hereby corrected as shown below:

On summary page at [73] after Assignee: "Metal Alloys Inc." should read --Metals Ltd.--

Column 2, line 67; after "consolidating" change "method" to --metal--

Column 4, line 12; after "metal" add --and--

Column 4, line 45; change "tons" to --TSI--

Signed and Sealed this

Fourteenth Day of January 1986

[SEAL]

*Attest:*

DONALD J. QUIGG

*Attesting Officer*   *Commissioner of Patents and Trademarks*